June 20, 1961  J. D. WELCH  2,989,649
LOW FREQUENCY OSCILLATOR
Filed Nov. 25, 1957
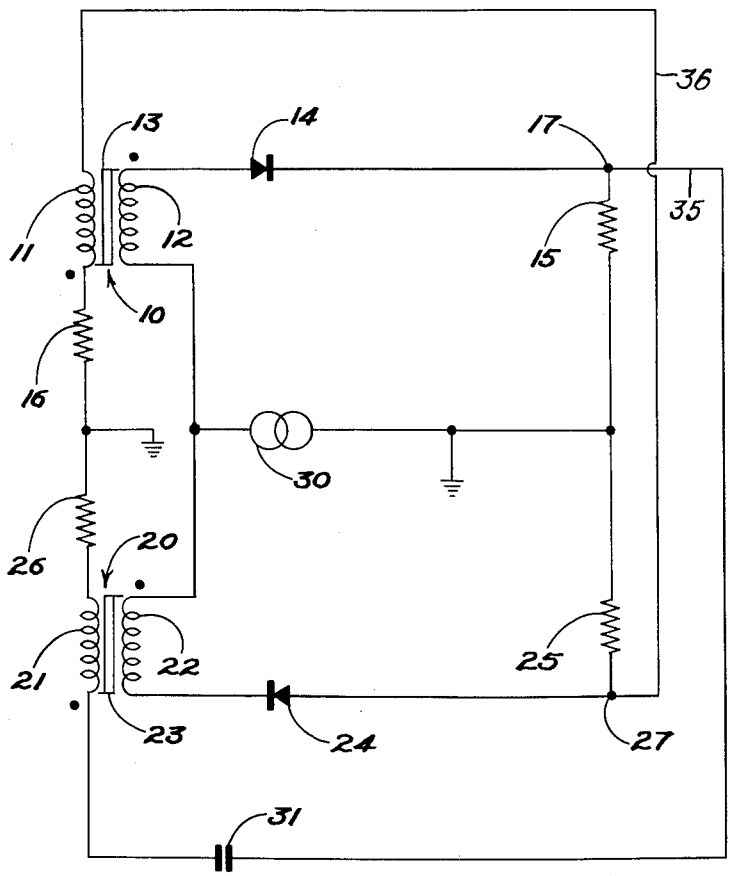
INVENTOR.
JACK D. WELCH
BY
ATTORNEYS 2,989,649
LOW FREQUENCY OSCILLATOR
Jack D. Welch, Cedar Rapids, Iowa, assignor to Collins Radio Company, Cedar Rapids, Iowa, a corporation of Iowa
Filed Nov. 25, 1957, Ser. No. 698,707
3 Claims. (Cl. 307—88)

This invention relates to power conversion systems and more particularly to frequency reducing systems utilizing saturable reactors.

In the prior art, typical frequency-changing conversion systems utilized either vibrating reed or Thyratron inverter systems. From a standpoint of reliability, long life, light weight, resistance to shock and vibration, the prior art circuits did not satisfy the more stringent situations. Further, the efficiency of the system suffered in vacuum tube or thermionic systems due to the heater power consumed by the tubes. In vibrating reed systems the contact life is usually poor.

It is an object of the invention to provide a frequency converter system yielding high efficiency with no moving parts, no sensitive or critical elements, yet having high vibration and shock resistance with an improved reliability of operation.

It is an object of this invention to provide a system capable of reducing frequency at power levels with a minimum of circuit elements and, consequently, a minimum of weight.

A feature of the invention lies in the use of saturable magnetic reactors.

Further objects, features and advantages of this invention will become apparent from the following description and claims when read in conjunction with the drawing, in which:

The figure shows the circuit diagram of the invention.

In the figure two saturable reactors 10 and 20 are employed in the frequency conversion circuit of the invention. Saturable reactor 10 has a control winding 11 and a load winding 12. These two windings are arranged on a saturable magnetic retentive core 13 in a manner well known in the art such that load winding 12 has a controllable effective impedance controlled by the relation of the fluxes set up by currents in the two windings at the time of reset. In other words, magnetic core 13 may be magnetized to some degree and with a predetermined polarity during that half cycle when current flows through load winding 12 and also during that half cycle when current flows through control winding 11. The current flow through load winding 12 plus any residual set that may be present determines the degree of magnetization or set of core 13 at the end of that half cycle during which current flows through load winding 12. When the current flow through control winding 11 opposes the substantially retained set of core 13 during the next half cycle of operation, the core is caused to reset in a direction opposite to the set caused by the current through load winding 12 during the preceding half cycle, which is to say that core 13 is caused to return towards its starting flux value. The instantaneous impedance may vary considerably each time reset occurs, but when averaged over a cycle of the current supplied to the load will be some average value controlled by the reset currents. At the instant of reset, the relations of the fluxes set up by load and control winding currents coact to establish the position of operation of the magnetic core on the B-H hysteresis diagram for that core. As is well known in the saturable reactor art, the low impedance (with minimum reset) will be essentially that of the resistance of the load winding, whereas the high impedance (with maximum reset) will be extremely high.

Load winding 12 is connected in a series circuit comprising power source 30, rectifier 14 and load 15. It is readily seen that power flow from source 30 to load 15 is unidirectional as a consequence of rectifier 14, and controlled in magnitude as a result of the effective impedance of load winding 12.

The control winding circuit for saturable reactor 10 consists of a series circuit of winding 11 and current control resistor 16. Inspection of the circuit shows some bilateral symmetry about power source 30. The series circuit of resistor 16 is placed in parallel with the counterpart load resistance 25 of the other half of the circuit through a wire 36 to terminal 27. Resistance 16 is then utilized primarily for balancing the halves of the waveform appearing in the load circuit. The adjustment of resistor 16 relative to its counterpart resistor 26 in the other half of the circuit determines the balance of time divided between the two oscillation cycle halves.

The other half of the circuit is arranged similarly to the first half detailed above. Saturable reactor 20 has a control winding 21 and a load winding 22 both of which are mounted on a saturable core 23. The load winding 22 is connected in a series circuit between power source 30 and rectifier 24. A connection including load 25 may or may not be connected between terminal 27 and ground in accord with the application of the circuit. The polarity of rectifier 24 is related oppositely to the polarity of rectifier 14.

As in the first described half, a current control resistor 26 is provided in series with control winding 21. This resistor is used to control the saturation characteristics of reactor 20 by its impedance level and the waveform balance by its relation to resistor 16. The series circuit of the control winding 21 and control winding resistor 26 is connected through capacitor 31 to load terminal 17 through a wire 35. Thus the symmetry of the circuit becomes apparent. A pair of current controlling circuits run in parallel from a common power source 30. The load terminals of these circuits provide control current for the opposite control circuit.

The load of the circuit is pictured as a resistance 15, attached to terminal 17. This load may be any type desired. The use of a lamp provides a flashing light provided that the frequency of operation is lower than the nigrescence of the lamp. Where alternating flashing lights such as a railway signal are desired, load 25 may also be a lamp. In this case, the power capabilities are balanced as to the power levels provided by the two reactors. On the event that a single load is to be energized, load 25 may be omitted as hereinabove brought out. The power capability of saturable reactor 20 then need be no greater than just sufficient to drive the control circuit of saturable reactor 10 connected to terminal 27.

The operation may be more easily explained if it is first assumed that both feedback loops 35 and 36 are disconnected. Under this condition, current in load winding 12 will be flowing toward the polarization dot due to the polarization of diode 14. The current will set the magnetization level of the core 13 by an amount dependent both upon the magnitude of the current and by the residual set in the core. With the feedback winding 36 disconnected, the core 13 will become saturated and, therefore, the impedance of the windings 11 and 12 will be reduced to a minimum.

The saturable reactor 20 will likewise have a current flowing through its load winding 22 toward the polarization dot due to the polarization of diode 24. However, diode 24 is polarized such that it allows current to flow during the negative portion of the cycle while diode 14 permits current to flow during the positive portion of the cycle. Thus the voltage appearing at 27 will be negative while the voltage at 17 will be positive.

With the feedback loops 35 and 36 connected, the positive voltage at 17 causes a current in the control winding of reactor 20 to flow away from the polarization dot, thus resetting the core 23 in a direction opposite to the set caused by the load current. This condition causes an increase in impedance in the load winding and a consequential drop in load current and voltage at junction 27. A drop in the voltage at junction 27 will cause the current in control winding 11 that was flowing away from the polarization dot to decrease. This decrease in current will cause less reset of the core by the control current thereby reducing the impedance of winding 12. The reduction in impedance of winding 12 will cause the voltage at junction 17 to increase by causing additional current to flow through winding 21. This increase in current will cause the impedance of load winding 22 to still further increase. Thus, the impedance of reactor 20 will continue to increase and the impedance of reactor 10 will continue to decrease until the voltage at terminal 17 becomes positive at its maximum level, and capacitor 31 becomes fully charged, reducing the charging current and the control current in winding 21. This reduced current in winding 21 causes reduction in the amount of reset in core 23. Consequently, the effective impedance of load winding 22 drops rapidly causing a rise in voltage at terminal 27. As the voltage at terminal 27 increases, more current flows in the control circuit of reactor 10 causing core 13 to be reset to a greater extent during each successive half cycle when current flows through control winding 11. The increased reset results in a higher effective impedance of load winding 12 during each half cycle when current flows through said winding and, therefore, a lower voltage results at terminal 17. As the voltage at terminal 17 drops to zero the charge on capacitor 31 begins to leak off causing reversed current in control winding 21 of reactor 20. The reversed current opposes the reset and aids change of the reactor to the low effective impedance condition. The change of winding 22 from high to low impedance is relatively sudden compared to a cycle of operation.

The low effective impedance of winding 21 remains until capacitor 31 has discharged completely and control current in winding 21 ceases to flow. The voltage at terminal 27 now starts to decrease due to the fact that the current through control winding 21 again causes core 23 to reset. The decrease of voltage at terminal 27 permits a reduction of control current in control winding 11 permitting the reactor 10 to begin its reset and start the second cycle of operation.

The waveform of the current in load 15 is thus a series of unidirectional power-source frequency pulses having an envelope or amplitude modulation of the waveform of the oscillation of the circuit as described. The high frequency components of the low frequency waveform are dependent on the LR constants of the control resistors and control windings so that the actual envelope appearing at terminals 17 and 27 has a shape lying somewhere between sine wave and square wave amplitude variation.

A working model embodying the invention described utilizes saturable cores having 200 turn control windings and 1,000 turn load windings. Resistors 16 and 26 are 3,300 and 470 ohms. Load 15 is a 40 mil light bulb, while resistor 25 is 2,200 ohms. Rectifiers 14 and 24 are silicon diodes—type IN458, and capacitor 31 is 200 microfarads. The power source 30 is 26 volts at 400 cycles. The repetition rate of the light flashing is approximately ninety flashes per minute.

Although this invention has been described with respect to particular embodiments thereof, it is not to be so limited as changes and modifications may be made therein which are within the full intended scope of the invention as defined by the appended claims.

I claim:

1. A low-frequency oscillator comprising first and second saturable reactors each including at least a core, a control and a load winding, means connecting one end of said first and second control windings to ground, an alternating current generator, means connecting one end of said first and second load windings to one pole of said generator, the remaining pole of said generator connected to ground, a load for said first saturable reactor including a first diode and a first loading means serially connected between the remaining end of said load winding and ground, a load for said second saturable reactor including a second diode oppositely poled from said first diode connected between the remaining end of the load winding of said second saturable reactor and the remaining end of the control winding of said first saturable reactor, and a timing capacitor connected between the remaining end of the control winding of said second saturable reactor and the junction between the first diode and first loading means whereby a low frequency oscillation is generated, the period of oscillation being determined by the timing capacitor and said load resistor.

2. A low-frequency oscillator as described in claim 1 and additionally including a second loading means connected between ground and the junction of the second diode and first saturable reactor control winding.

3. A low-frequency oscillator comprising first and second magnetic reactors, each containing at least a core, a control and load winding, an alternating power ource, a first load serially connected to the load winding of said first reactor, a first rectifying means for supplying the positive portion of the voltage from said alternating power source to said serially-connected first reactor load winding and first load, a second load serially connected to the load winding of said second reactor, a second rectifying means for supplying the negative portion of the voltage from said alternating power source to said serially-connected second reactor load winding and second load, and means for applying the voltage from said first and second loads to said second and first saturating reactor control windings respectively such that the current through the control windings will reset said cores in a direction opposite to the current flowing in said load windings, said means applying the voltage from said first load to said second reactor control windings including a reactive timing element.

References Cited in the file of this patent
UNITED STATES PATENTS

| | | |
|---|---|---|
| 1,968,576 | Suits | July 31, 1934 |
| 2,717,965 | Ramey | Sept. 13, 1955 |
| 2,747,109 | Montner | May 22, 1956 |
| 2,766,420 | Ramey | Oct. 9, 1956 |
| 2,830,197 | Spencer et al. | Apr. 8, 1958 |
| 2,830,198 | Eckert et al. | Apr. 8, 1958 |
| 2,899,568 | Drewe et al. | Aug. 11, 1959 |

FOREIGN PATENTS

| | | |
|---|---|---|
| 412,235 | Great Britain | June 22, 1934 |